United States Patent
Tang et al.

(10) Patent No.: US 7,702,977 B1
(45) Date of Patent: Apr. 20, 2010

(54) PROGRAMMABLE LOGIC DEVICES WITH CUSTOM IDENTIFICATION SYSTEMS AND METHODS

(75) Inventors: Howard Tang, San Jose, CA (US); Om P. Agrawal, Los Altos, CA (US); Fabiano Fontana, San Jose, CA (US)

(73) Assignee: Lattice Semiconductor Corporation, Hillsboro, OR (US)

( * ) Notice: Subject to any disclaimer, the term of this patent is extended or adjusted under 35 U.S.C. 154(b) by 0 days.

(21) Appl. No.: 12/480,565

(22) Filed: Jun. 8, 2009

Related U.S. Application Data

(63) Continuation of application No. 11/446,308, filed on Jun. 2, 2006, now Pat. No. 7,546,498.

(51) Int. Cl.
*G01R 31/28* (2006.01)
*G06F 21/00* (2006.01)

(52) U.S. Cl. .................. 714/724; 714/727; 713/182; 326/38

(58) Field of Classification Search .......... 714/724–727; 713/182–186; 326/37–41, 47
See application file for complete search history.

(56) References Cited

U.S. PATENT DOCUMENTS

| | | | | |
|---|---|---|---|---|
| 5,325,368 A | * | 6/1994 | James et al. ............. 714/727 |
| 5,491,666 A | * | 2/1996 | Sturges .................... 365/201 |
| 5,734,868 A | * | 3/1998 | Curd et al. .................... 716/5 |
| 5,970,005 A | * | 10/1999 | Yin et al. ................... 365/201 |
| 6,012,155 A | * | 1/2000 | Beausang et al. .......... 714/727 |
| 6,195,774 B1 | * | 2/2001 | Jacobson ................... 714/727 |
| 6,408,414 B1 | * | 6/2002 | Hatada ...................... 714/727 |
| 6,539,511 B1 | * | 3/2003 | Hashizume ................ 714/727 |
| 6,922,820 B1 | * | 7/2005 | Lulla et al. ................... 716/4 |
| 7,216,275 B2 | * | 5/2007 | Liang ........................ 714/727 |
| 7,301,836 B1 | * | 11/2007 | Raghavan et al. .......... 365/201 |
| 2003/0079166 A1 | * | 4/2003 | Vermeulen et al. ......... 714/727 |
| 2003/0163773 A1 | * | 8/2003 | O'Brien et al. ............ 714/726 |
| 2004/0001432 A1 | * | 1/2004 | Wescott .................... 370/217 |
| 2004/0083414 A1 | * | 4/2004 | Parker et al. .............. 714/737 |
| 2006/0179373 A1 | * | 8/2006 | Ishikawa ................... 714/727 |

\* cited by examiner

*Primary Examiner*—James H. Cho
*Assistant Examiner*—Jason Crawford

(57) ABSTRACT

In one embodiment, a programmable logic device includes a first multiplexer; a first memory adapted to store an identification code of the programmable logic device; and a second memory adapted to store an identification code of the programmable logic device. Inputs of a second multiplexer are coupled to the first memory and the second memory, and an output of the multiplexer is coupled to an input of the first multiplexer. The second multiplexer is adapted to select between the identification code stored in the first memory and the identification code stored in the second memory to provide the selected identification code to the first multiplexer.

12 Claims, 3 Drawing Sheets

US 7,702,977 B1

PROGRAMMABLE LOGIC DEVICES WITH CUSTOM IDENTIFICATION SYSTEMS AND METHODS

RELATED APPLICATION DATA

This application is a continuation of U.S. application Ser. No. 11/446,308, filed Jun. 2, 2006, now U.S. Pat. No. 7,546,498, issued Jun. 9, 2009, which is incorporated by reference in its entirety.

TECHNICAL FIELD

The present invention relates generally to electrical circuits and, more particularly, to programmable logic devices, such as field programmable gate arrays with non-volatile memory.

BACKGROUND

A programmable logic device, such as field programmable gate array (FPGA) or a complex programmable logic device (CPLD), may be used in a variety of applications. A programmable logic device (PLD) offers the advantage of being reprogrammable in the field (e.g., while on the circuit board in its operational environment) to provide a wide range of programmable functions. A PLD may also provide certain advantages for implementing new product designs in integrated circuits relative to other traditional technologies (e.g., an application specific integrated circuit (ASIC) or an application specific standard product (ASSP)), such as for example, in terms of non-recurring engineering costs and other product development costs.

A conventional PLD typically supports the IEEE 1149.1 boundary scan test interface standard (also known as the JTAG standard) and therefore, for example, may be implemented as part of a JTAG scan chain. However, a drawback of a conventional PLD is that a user of the PLD cannot change the PLD's hard-wired 32-bit boundary scan identification code (IDCODE), which includes information regarding the manufacturer of the PLD along with device and version information. For example, a user of the PLD may want to change the identification code of the PLD so that the PLD will appear as the user's custom or proprietary device (e.g., the user's ASSP within the JTAG scan chain). As a result, there is a need for improved techniques directed towards PLD identification codes.

SUMMARY

In one embodiment of the invention, a programmable logic device includes a first multiplexer; a first memory adapted to store an identification code of the programmable logic device; and a second memory adapted to store an identification code of the programmable logic device. Inputs of a second multiplexer are coupled to the first memory and the second memory, and an output of the multiplexer is coupled to an input of the first multiplexer. The second multiplexer is adapted to select between the identification code stored in the first memory and the identification code stored in the second memory to provide an identification code to the first multiplexer.

In another embodiment of the invention, a programmable logic device includes a first memory adapted to store an identification code of the programmable logic device; a second memory adapted to store at least one of an identification code and a usercode of the programmable logic device; and a multiplexer adapted to select between the identification code stored in the first memory and second identification code stored in the second memory to provide an identification code for the programmable logic device. A third memory is adapted to store at least one of an identification code and a usercode of the programmable logic device. Control logic is adapted to transfer at least one of an identification code and a usercode from the third memory to the second memory.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
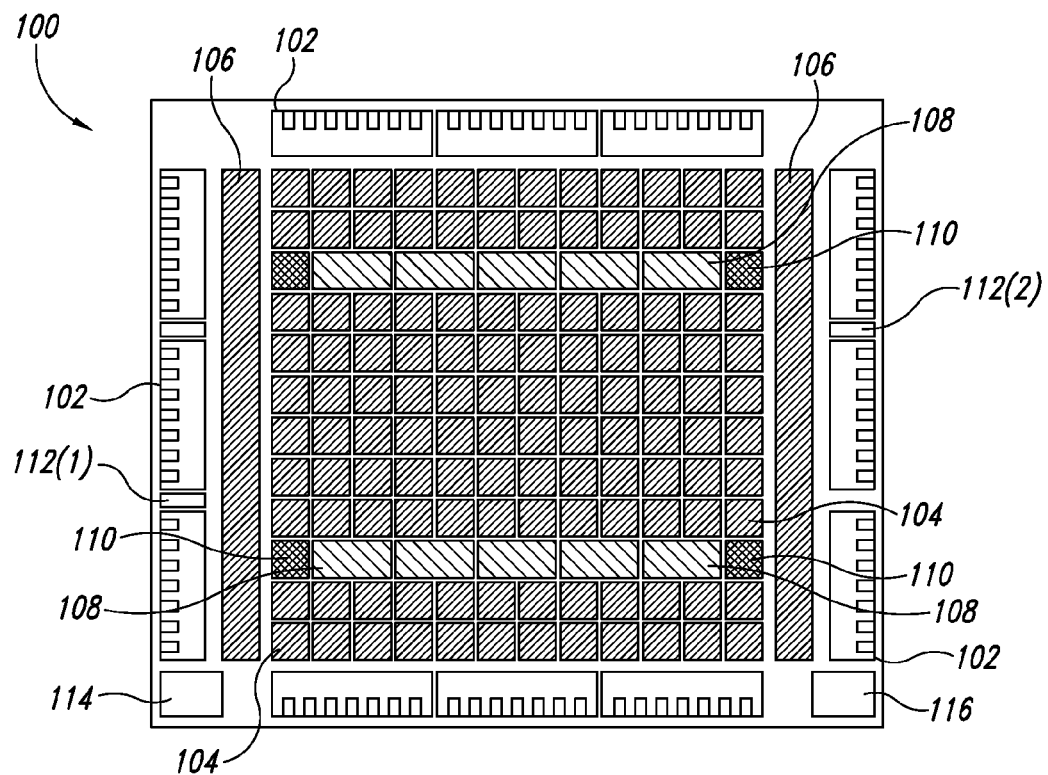
FIG. 1 shows a block diagram illustrating an exemplary programmable logic device in accordance with an embodiment of the present invention.

FIG. 1 shows a block diagram illustrating an exemplary programmable logic device (PLD) 100 in accordance with an embodiment of the present invention. PLD 100 (e.g., an FPGA) includes input/output (I/O) blocks 102 and programmable logic blocks 104. I/O blocks 102 provide I/O functionality (e.g., supports one or more I/O and/or memory interface standards) for PLD 100. Programmable logic blocks 104 (e.g., also referred to in the art as configurable logic blocks or logic array blocks) provide logic functionality for PLD 100, such as for example LUT-based logic typically associated with FPGAs.

PLD 100 may also include reprogrammable non-volatile memory 106 (e.g., blocks of EEPROM or flash memory), volatile memory 108 (e.g., block SRAM), clock-related circuitry 110 (e.g., PLL circuits), one or more data ports 112, configuration memory 114, and/or an interconnect 116. It should be understood that the number and placement of the various elements, such as I/O blocks 102, logic blocks 104, non-volatile memory 106, volatile memory 108, clock-related circuitry 110, data port 112, configuration memory 114, and interconnect 116, is not limiting and may depend upon the desired application. Furthermore, it should be understood that the elements are illustrated in block form for clarity and that certain elements, such as configuration memory 114 and interconnect 116, would typically be distributed throughout PLD 100, such as for example in and between logic blocks 104, to perform their conventional functions (e.g., storing configuration data that configures PLD 100 and providing routing resources, respectively).

Data port 112 may be used for programming PLD 100, as would be understood by one skilled in the art. For example, data port 112(1) may represent a programming port such as a central processing unit (CPU) port, also referred to as a peripheral data port or a sysCONFIG programming port. Data port 112(2) may represent, for example, a programming port such as a joint test action group (JTAG) port by employing standards such as Institute of Electrical and Electronics Engineers (IEEE) 1149.1 and/or IEEE 1532 standards. Data ports 112(1) and 112(2) are not both required, but one or the other or both may be included to receive configuration data and commands.

Non-volatile memory 106 may be used to store configuration data within PLD 100 for transfer to configuration memory 114 of PLD 100 upon power up or during reconfiguration of PLD 100. This may drastically reduce the time to reconfigure PLD 100 relative to an external bitstream (e.g., reduce the time from seconds to microseconds for loading of configuration data into configuration memory 114).

Non-volatile memory 106 may also be used to provide background programming and/or storage for PLD 100 in accordance with some embodiments of the present invention. For example for storage functionality, non-volatile memory 106 may be used as non-volatile storage for a user or manufacture to store various test data, system management information, manufacturing control information, failure statistics information for board level diagnostics, security bits, identification codes, identification code selection bits (e.g., one or more custom ID fuses), and/or other information as desired and as explained further herein.

For example for background programming, PLD 100 may remain in user mode, based on the configuration data stored in configuration memory 114 within PLD 100, while non-volatile memory 106 is programmed with new configuration data (e.g., a new user defined pattern). Once the new configuration data is stored in non-volatile memory 106, this data can be transferred from non-volatile memory 106 to configuration memory 114 to reconfigure PLD 100, a process sometimes referred to as refresh. The refresh process can be initiated by a signal or instruction provided to data port 112 (e.g., pulsing data port 112(1) or providing a JTAG refresh instruction via data port 112(2)).

Figure 2:
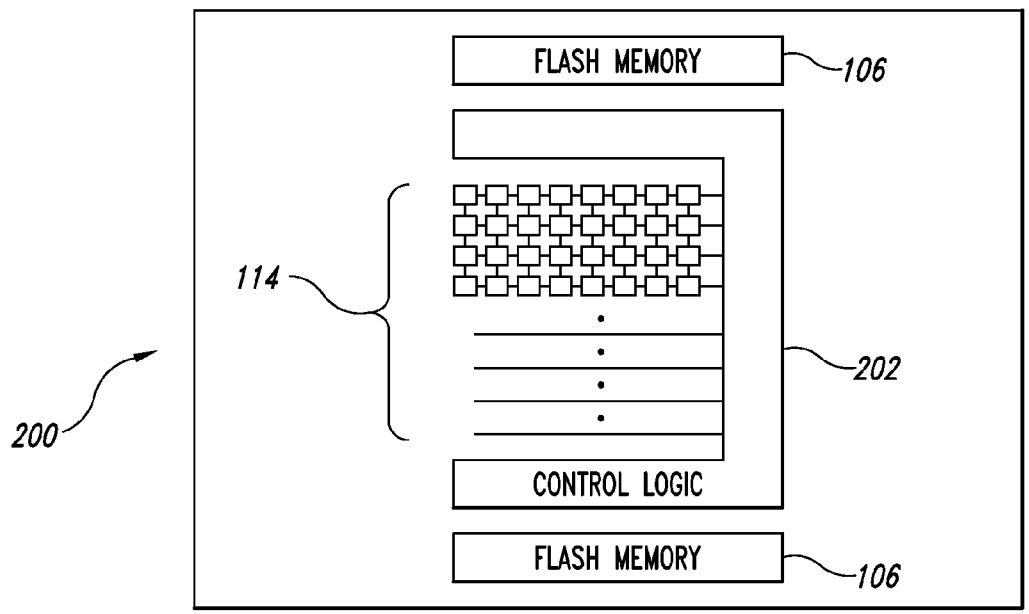
FIG. 2 shows a block diagram illustrating exemplary implementation details for a non-volatile memory and configuration memory of the programmable logic device of FIG. 1 in accordance with an embodiment of the present invention.

As a specific example, FIG. 2 shows a block diagram illustrating a PLD 200, which provides exemplary implementation details for PLD 100 of FIG. 1 in accordance with an embodiment of the present invention. PLD 200 includes non-volatile memory 106 (e.g., flash memory), configuration memory 114, and control logic 202.

Configuration memory 114 (e.g., volatile SRAM cells or other types of volatile or non-volatile memory) are used in a conventional manner to store configuration data, which determines the user defined functions of PLD 200 (e.g., determines programmable functions of I/O blocks 102, logic blocks 104, and interconnect 116). Control logic 202 controls the internal transfer of the configuration data from non-volatile memory 106 to configuration memory 114, as would be understood by one skilled in the art.

It should be understood that flash memory represents an exemplary type of memory for non-volatile memory 106, but other types of non-volatile memory (e.g., EECMOS) that can be reprogrammed once or repeatedly may be substituted for non-volatile memory 106. Furthermore for example in accordance with one or more embodiments of the present invention, either non-volatile memory 106 or configuration memory 114 may be programmed (i.e., receive and store information in its memory) to store configuration data for PLD 200, but the device functionality of PLD 200 is determined by the information stored in configuration memory 114. Thus, PLD 200 may be configured (including reconfiguration or partial reconfiguration), for example, when information is programmed into configuration memory 114.

It should also be understood, in accordance with one or more embodiments of the present invention, that non-volatile memory 106 and configuration memory 114 may each be programmed (including reprogrammed), for example, via data port 112(1) or data port 112(2), depending upon the desired application or design requirements. Further details regarding programming may be found in U.S. Pat. No. 6,828, 823 and U.S. Patent Publication No. 2005-0189962-A1, published Sep. 1, 2005.

As noted herein, the JTAG standard specifies a 32-bit JTAG boundary scan identification code (IDCODE) to be unique for each type of device, such as PLD 100. However, conventional approaches do not permit a user of a preprogrammed or a blank (e.g., un-programmed) PLD device to change the IDCODE so that the PLD device will behave and respond, for example, as the user's own "custom" device (e.g., as its own proprietary ASSP or PLD).

In contrast in accordance with one or more embodiments of the present invention, techniques are disclosed to provide a non-volatile PLD (e.g., FPGA) with a custom ID capability (e.g., custom IDCODE). For example in accordance with an embodiment of the present invention, a PLD is disclosed that allows a user the ability to customize the PLD to the user's application specific or custom needs by allowing the user to specify its own identification code (IDCODE) for the PLD rather than the fixed IDCODE provided by the manufacturer of the PLD. Consequently, if desired by a user of the PLD, the PLD may respond to the JTAG request (or scan) with the user's custom IDCODE rather than the hard-wired IDCODE set by the PLD manufacturer.

Figure 3:
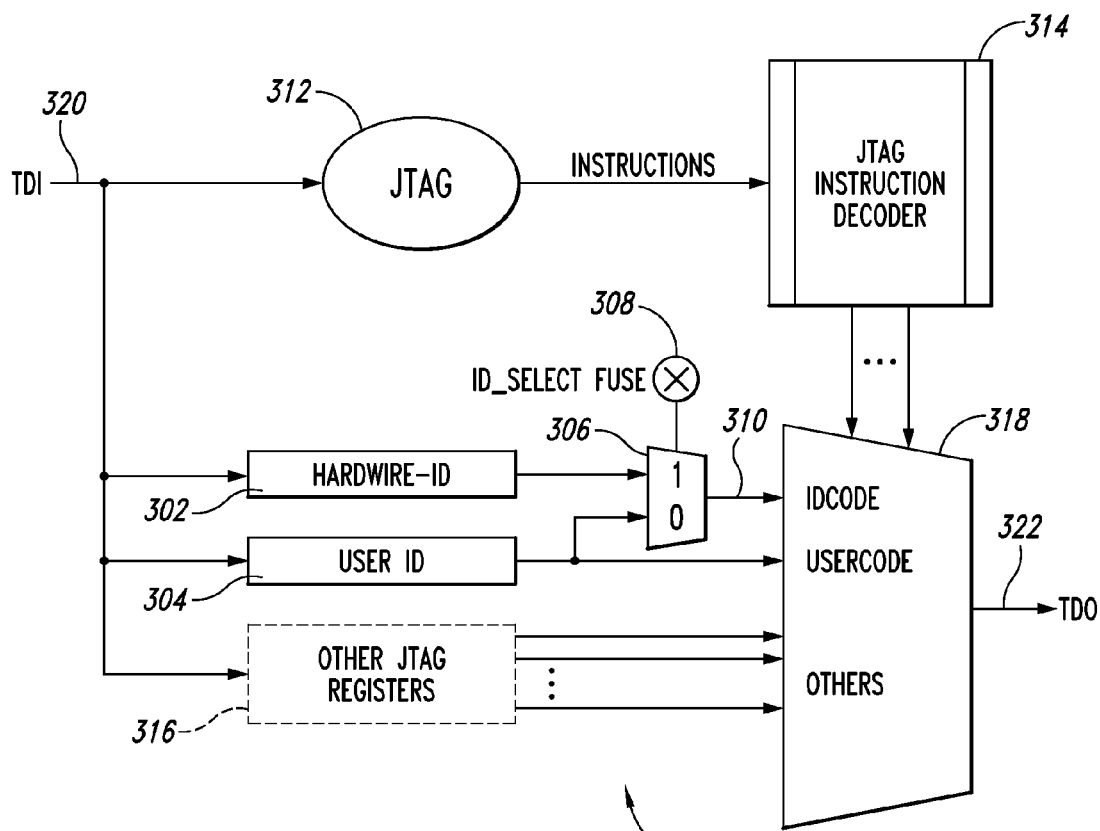
FIG. 3 shows a block diagram illustrating exemplary implementation details for providing a customized identification code for the programmable logic device of FIG. 1 in accordance with an embodiment of the present invention.

For example, FIG. 3 shows a circuit 300, which illustrates exemplary implementation details for providing a customized identification code (IDCODE) for PLD 100 (or PLD 200) of FIG. 1 in accordance with an embodiment of the present invention. Circuit 300 includes a non-volatile memory 302, a memory 304, and a multiplexer 306 as shown along with simplified exemplary JTAG details.

Non-volatile memory 302 may represent the hard-wired identification code (IDCODE) that may be provided in a conventional fashion (e.g., in ROM) or stored in some other form of non-volatile memory (e.g., non-volatile memory 106). Memory 304 may represent non-volatile storage (e.g., within non-volatile memory 106 or other forms of non-volatile storage, such as ROM) or volatile memory, as explained further herein (e.g., in reference to FIG. 5), for a user-specified custom identification code (IDCODE) to be stored.

Circuit 300 also shows various exemplary conventional JTAG details (as would be understood by one skilled in the art), such as a JTAG state machine 312, a JTAG instruction decoder 314, JTAG registers 316, and a JTAG select multiplexer 318. Per the JTAG standard, circuit 300 includes a test data input (TDI) 320 and a test data output (TDO) 322 for circuit 300 to receive and provide various information.

Multiplexer 306 may be controlled to select the hard-wired identification code (IDCODE) stored in non-volatile memory 302 or the user-specified custom identification code (ID- CODE) stored in memory 304 to provide on TDO 322 as the IDCODE for the PLD. As an example, a control signal to control multiplexer 306 may be provided, as shown in FIG. 3, by a fuse 308 (also referred to herein as a custom ID fuse). Fuse 308, which may be a dedicated fuse, may represent for example one or more of the memory cells of non-volatile memory 106 or some other type of non-volatile memory technology. Consequently for example, depending upon the value stored by fuse 308, either the hard-wired identification code (IDCODE) stored in non-volatile memory 302 or the user-specified custom identification code (IDCODE) stored in memory 304 will be provided as an output signal 310 from multiplexer 306 to be provided on TDO 322 as the IDCODE.

For the IDCODE information, there are at least two ways to access the IDCODE register (e.g., non-volatile memory 302 or memory 304 depending upon which is selected by multiplexer 306), one by state and one by instruction (as would be understood by one skilled in the art). As set forth in the JTAG standard, moving directly from Test-Logic-Reset to Shift-DR will select the IDCODE register. Alternatively, loading the IDCODE instruction in Shift-IR will select the IDCODE register in Shift-DR. Therefore for the example above, a user by appropriately setting fuse 308 can control whether a custom ID Code from memory 304 or the manufacturer's ID code from non-volatile memory 302 is provided by the PLD as its identification code (IDCODE).

As a specific example, if fuse 308 (labeled ID_Select Fuse) is not programmed, then the contents of non-volatile memory 302 (e.g., the hard-wired identification code (IDCODE)) is provided to JTAG select multiplexer 318 to provide on TDO 322 as the IDCODE. Consequently if the IDCODE instruction is loaded into JTAG state machine 312, the hard-wired identification code (IDCODE) stored in non-volatile memory 302 is provided to TDO 322 to be read out. If fuse 308 is programmed, then the contents of memory 304 (e.g., the user-specified custom identification code (IDCODE)) is provided to JTAG select multiplexer 318 to provide on TDO 322 as the IDCODE. Consequently if the IDCODE instruction is loaded into JTAG state machine 312, the user-specified custom identification code (IDCODE) stored in memory 304 is provided to TDO 322 to be read out.

If JTAG state machine 312 is driven into a test-logic-reset (TLR) state, the IDCODE instruction is loaded automatically by JTAG state machine 312 and, therefore, there is no need to clock the IDCODE instruction into JTAG state machine 312 via TDI 320. The PLD containing circuit 300 can then be driven to Shift-DR state to shift out the IDCODE provided on TDO 322 (this technique also commonly known and referred to as scanning). Consequently, depending upon the value provided by fuse 308, either the hard-wired identification code (IDCODE) stored in non-volatile memory 302 or the user-specified custom identification code (IDCODE) stored in memory 304 will be provided on TDO 322 as the IDCODE.

The custom identification code (IDCODE) stored in memory 304 may be similar to the hard-wired identification code (IDCODE) stored in non-volatile memory 302 in terms of the number of bits (e.g., 32 bits) and the type of information stored. For example, the information provided as specified by the JTAG standard may include the manufacturer or user ID, part number of the PLD, and version.

A user programmable 32-bit boundary scan USERCODE register (e.g., to store a version number for version control of embedded applications) as described in the JTAG standard may also be provided and associated with non-volatile memory 302 and/or memory 304. Alternatively, memory 304 may represent the USERCODE register as set forth in the JTAG standard. Consequently, in accordance with one or more embodiments of the present invention, the USERCODE register may be also used by a user to provide a programmable IDCODE, rather than the hard-wired IDCODE, via multiplexer 306.

For example as shown in FIG. 3, memory 304 (e.g., the USERCODE register) may store and provide the USERCODE (e.g., as programmed by a user) via JTAG select multiplexer 318 onto TDO 322 in a conventional fashion. Additionally as shown in FIG. 3, memory 304 (e.g., the USERCODE register) may store and provide the IDCODE (e.g., as programmed by a user) via multiplexer 306 and JTAG select multiplexer 318 onto TDO 322.

As noted above in accordance with an embodiment of the present invention, memory 304 and/or fuse 308 may represent a portion of non-volatile memory 106 (e.g., a flash memory block of PLD 100). For example, non-volatile memory 106 may be partitioned into different sections, with one section for non-volatile storage of configuration data that can be transferred to configuration memory 114 and another section for non-volatile storage of other information, such as the user's custom ID code and custom ID fuse value.

Figure 4:
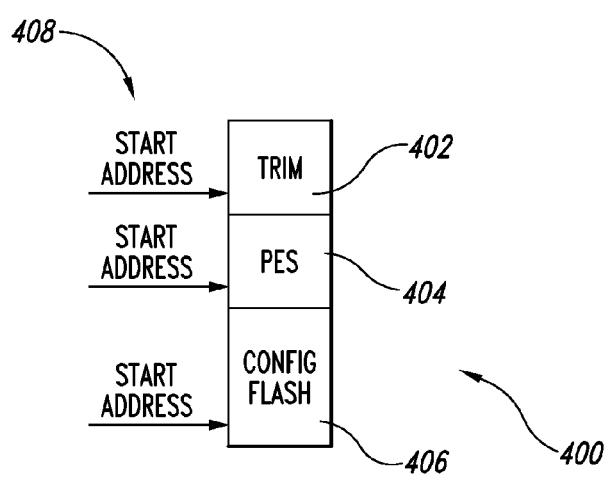
FIG. 4 shows a block diagram illustrating exemplary implementation details for a non-volatile memory of the programmable logic device of FIG. 1 in accordance with an embodiment of the present invention.

As a specific implementation example, FIG. 4 shows a block diagram illustrating exemplary implementation details for a non-volatile memory 400 of PLD 100 of FIG. 1 in accordance with an embodiment of the present invention. Specifically as an example, non-volatile memory 400 may represent a specific implementation example for non-volatile memory 106, with non-volatile memory 400 partitioned (segmented) into a trim portion 402 (labeled TRIM), a test portion 404 (labeled PES), and a configuration data portion 406 (labeled config flash).

Trim portion 402 is optional and may be used to store trim data, which may be used for adjusting or trimming various parameters within PLD 100 (e.g., adjusting current source values, resistor values, or other circuit parameters as would be understood by one skilled in the art). Test portion 404 (e.g., also referred to as program electronic signature (PES) in one embodiment) may be used to store test or design data and other types of information, as desired by a user. Configuration data portion 406 may be used to store configuration data for transfer to configuration memory 114 to reconfigure PLD 100. Non-volatile memory 400 (e.g., flash memory) may have a different starting address 408, as shown, for each portion or section.

Fuse 308 and/or memory 304, which contains the custom identification code (IDCODE) or a user code (USERCODE), may be formed as part of non-volatile memory 400 (e.g., flash memory). For example, fuse 308 and/or memory 304 may be located within test portion 404 of non-volatile memory 400. Consequently, memory 304 (e.g., non-volatile flash memory) and fuse 308 would not require a separate erasure process and, for example, may be on the same flash row as the test data, security bits, and/or encryption fuses and share the same erasure process.

As an example, memory 304 and fuse 308 may be disposed within the PLD so as to avoid the accidental erasure of these values when programming the PLD with new configuration data. In general, a user typically may not want the IDCODE and fuse value to be erased during a bulk erase or erase all instructions provided to the PLD. For example, memory 304 and fuse 308 may only be erased by a manufacturing enabled erase.

If some form of security is implemented for the PLD, such as security bits that may be set in a conventional fashion to prevent unauthorized access to the PLD or to prevent the programming or reading out of the programmed data from the PLD, then depending upon the implementation of memory 304 and fuse 308, a user may have to program the IDCODE and the value of fuse 308 prior to setting the security features of the PLD, which may prevent any further changes to the values stored as the IDCODE or the fuse value.

If a user programs fuse 308 to provide the user's custom ID code, the PLD manufacturer's programming software may not recognize the device in the JTAG scan chain without being provided with the custom ID code to recognize as a particular device. However, the PLD manufacturer's programming software would still be able to program the PLD if the hard-wired ID code provided by the manufacturer was accessible by using the standard JTAG procedures.

For example, a user may desire to program the PLD to operate as an ASSP that may only be programmed or reprogrammed to support the user's specific IP. Thus, the user could program the value of fuse 308 (custom ID fuse) so that the custom IDCODE of the user is provided as the PLD's ID code during scanning (JTAG scan to acquire the IDCODE). Consequently, only the user's specific programming tool will recognize the PLD based upon the user's custom IDCODE and the customer can control the distribution of its ASSP solution. Furthermore, the PLD manufacturer could program the PLD with a user's desired IDCODE value prior to shipment to the user and may further mark (e.g., by text, colors, indentations, or other conventional means for identifying) the PLD so that the PLD could be distinguished visually as an ASSP version of the PLD as compared to the standard version of the PLD.

Figure 5:
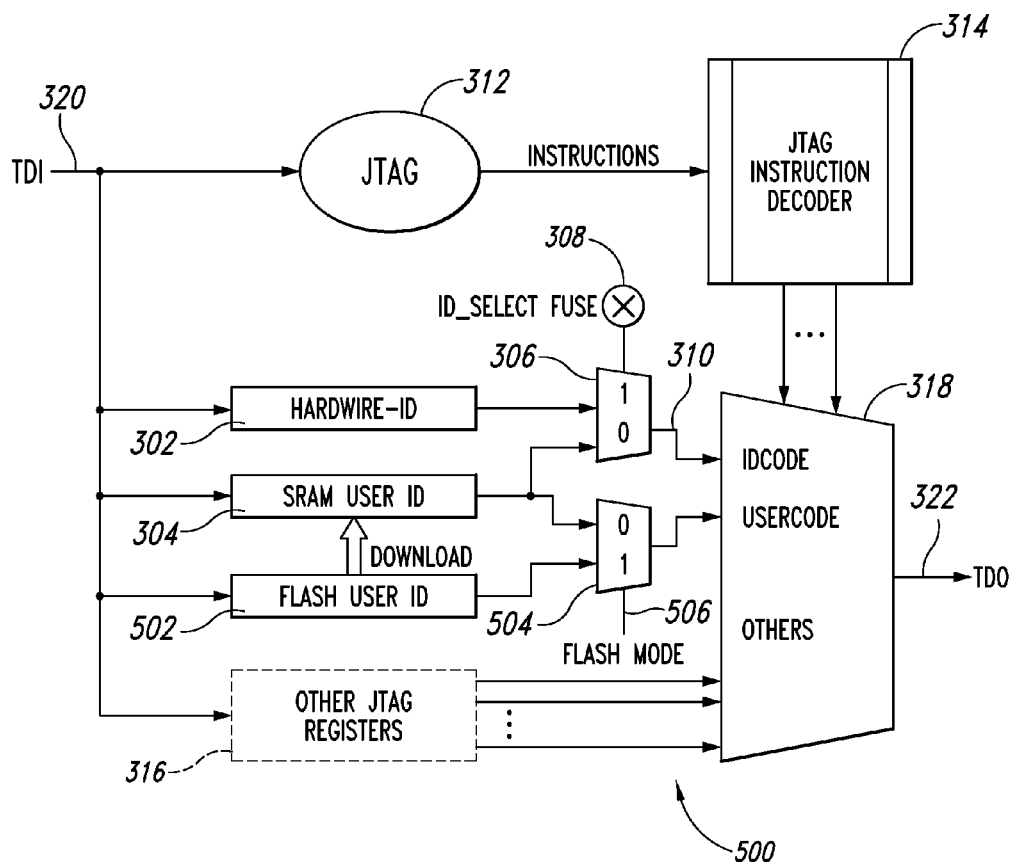
FIG. 5 shows a block diagram illustrating exemplary implementation details for providing a customized identification code for the programmable logic device of FIG. 1 in accordance with an embodiment of the present invention.

Circuit 300 (FIG. 3) illustrates in accordance with one or more embodiments of the present invention an exemplary implementation for providing a user the ability to provide either the hard-wired IDCODE or a user-specified IDCODE. As another example, FIG. 5 shows a circuit 500, which illustrates exemplary implementation details for providing a customized identification code (IDCODE) for PLD 100 of FIG. 1 in accordance with an embodiment of the present invention. Circuit 500 is similar to circuit 300, but provides another implementation example for selectively providing the user-specified IDCODE.

Specifically, circuit 500 further includes a non-volatile memory 502 and a multiplexer 506. For this example, memory 304 may represent volatile SRAM memory (e.g., a number of SRAM cells of configuration memory 114), which may store a USERCODE or an IDCODE as programmed by a user of the PLD that includes circuit 500. Non-volatile memory 502 may represent any form of non-volatile memory, such as for example a portion of non-volatile memory 106 (e.g., test portion 404), which may also store a USERCODE or an IDCODE as programmed by a user of the PLD.

Consequently as shown in FIG. 5, non-volatile memory 302 or memory 304 may be selected to provide its stored data as the IDCODE onto TDO 322 for the PLD via multiplexer 306 and JTAG select multiplexer 318. Furthermore, non-volatile memory 502 or memory 304 may be selected to provide its stored data onto TDO 322 as the USERCODE for the PLD via multiplexer 504 and JTAG select multiplexer 318. Multiplexer 504 may be controlled by a control signal 506 (labeled Flash mode), which for example may be provided by a fuse as described similarly for multiplexer 306 and fuse 308.

As an example of operation, a user may program memory 304 to store a custom IDCODE (a User IDCODE), program fuse 308 with a logical low value (i.e., a "0") to control multiplexer 306 to select memory 304, program non-volatile memory 502 to store a USERCODE, and provide a logical high value (i.e., a "1") with control signal 506 to control multiplexer 504 to select non-volatile memory 502. Consequently, memory 304 will provide its programmed IDCODE as the IDCODE for the PLD when requested per the JTAG standard, while non-volatile memory 502 will provide its programmed USERCODE as the USERCODE for the PLD when requested per the JTAG standard.

Additionally in accordance with one or more embodiments of the present invention, the information stored in non-volatile memory 502 may be transferred (downloaded) to memory 304, as desired by a user (e.g., via control logic 202). Consequently for example, a new USERCODE or custom IDCODE may be programmed into non-volatile memory 502 (e.g., during a background programming operation) while the PLD continues to operate and memory 304 continues to provide its currently stored information (e.g., IDCODE or USERCODE, depending upon selection by multiplexers 306 and 504). The user may then transfer the new information from non-volatile memory 502 to memory 304, when desired, so that memory 304 may provide the new information (e.g., IDCODE or USERCODE). It should also be understood that a number of custom IDCODES and/or USERCODES may be stored by additional memories and selected and provided as the PLD's IDCODE and USERCODE by utilizing the techniques discussed herein in accordance with one or more embodiments of the present invention.

Systems and methods are disclosed herein to provide techniques for providing programmable ID codes for PLDs. For example, in accordance with an embodiment of the present invention, a PLD is disclosed that allows a user to use the hard-wired IDCODE value provided with the PLD or allow a user to program into the PLD a custom IDCODE value. Consequently for example, a user may program the PLD to function as its custom device, such as an ASSP.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A programmable logic device comprising:
a first multiplexer;
a first memory adapted to store an identification code of the programmable logic device;
a second memory adapted to store an identification code of the programmable logic device; and
a second multiplexer having a first input coupled to the first memory, a second input coupled to the second memory, and an output coupled to an input of the first multiplexer, the second multiplexer adapted to select between the identification code stored in the first memory and the identification code stored in the second memory and to provide the selected identification code to the first multiplexer,
wherein the second memory is further adapted to store at least one of an identification code and a usercode and is further coupled directly to another input of the first multiplexer to provide a usercode to the first multiplexer.

2. The programmable logic device of claim 1 including an instruction decoder, wherein the first multiplexer is responsive to the instruction decoder in selecting an input.

3. The programmable logic device of claim 2, wherein the instruction decoder is a JTAG instruction decoder and the first multiplexer is a JTAG multiplexer.

4. The programmable logic device of claim 1, wherein the first memory is non-volatile memory adapted to store a hard-wired identification code, and the second memory is adapted to store a user-provided customized identification code.

5. A programmable logic device comprising:

a first multiplexer;

a first memory adapted to store an identification code of the programmable logic device;

a second memory adapted to store an identification code of the programmable logic device;

a second multiplexer having a first input coupled to the first memory, a second input coupled to the second memory, and an output coupled to an input of the first multiplexer, the second multiplexer adapted to select between the identification code stored in the first memory and the identification code stored in the second memory and to provide the selected identification code to the first multiplexer;

a third memory adapted to store at least one of an identification code and a usercode of the programmable logic device;

the second memory further adapted to store at least one of an identification code and a usercode of the programmable logic device; and a third multiplexer having a first input coupled to the second memory, a second input coupled to the third memory, and an output coupled to an input of the first multiplexer, the third multiplexer adapted to select between a usercode stored in the third memory and a usercode stored in the second memory and to provide the selected usercode to the first multiplexer.

6. The programmable logic device of claim 5 including control logic adapted to transfer at least one of an identification code and a usercode from the third memory to the second memory.

7. A programmable logic device comprising:

a first memory adapted to store an identification code of the programmable logic device;

a second memory adapted to store at least one of an identification code and a usercode of the programmable logic device;

a multiplexer adapted to select between the identification code stored in the first memory and second identification code stored in the second memory and to provide the selected identification code for the programmable logic device;

a third memory adapted to store at least one of an identification code and a usercode of the programmable logic device; and control logic adapted to transfer at least one of an identification code and a usercode from the third memory to the second memory.

8. The programmable logic device of claim 7, wherein the first memory is non-volatile memory adapted to store a hard-wired identification code, and the second memory is adapted to store a user-provided customized identification code.

9. The programmable logic device of claim 7 including a second multiplexer adapted to select between a usercode stored in the second memory and a usercode stored in the third memory and to provide the selected usercode for the programmable logic device.

10. A programmable logic device comprising:

a multiplexer;

a first memory adapted to store an identification code of the programmable logic device;

a second memory adapted to store an identification code of the programmable logic device;

means for selecting between the identification code stored in the first memory and the identification code stored in the second memory and for providing the selected identification code to an input of the first multiplexer;

a third memory adapted to store at least one of an identification code and a usercode of the programmable logic device;

the second memory further adapted to store at least one of an identification code and a usercode of the programmable logic device; and means for selecting between a usercode stored in the third memory and a usercode stored in the second memory and for providing the selected usercode to an input of the first multiplexer.

11. The programmable logic device of claim 10 including means for transferring at least one of an identification code and a usercode from the third memory to the second memory.

12. The programmable logic device of claim 10, wherein the first memory is non-volatile memory adapted to store a hard-wired identification code, and the second memory is adapted to store a user-provided customized identification code.

\* \* \* \* \*